United States Patent
Singh et al.

(10) Patent No.: US 9,982,723 B2
(45) Date of Patent: *May 29, 2018

(54) ROTATING CLUTCH PACK ASSEMBLY

(71) Applicant: GM Global Technology Operations LLC, Detroit, MI (US)

(72) Inventors: Tejinder Singh, Commerce Township, MI (US); Boris Burgman, Oak Park, MI (US); John A. Diemer, Farmington Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 164 days.

This patent is subject to a terminal disclaimer.

(21) Appl. No.: 15/043,778

(22) Filed: Feb. 15, 2016

(65) Prior Publication Data

US 2016/0160934 A1  Jun. 9, 2016

Related U.S. Application Data

(63) Continuation of application No. 14/196,791, filed on Mar. 4, 2014, now Pat. No. 9,261,186.

(51) Int. Cl.
| | |
|---|---|
| *F16H 3/44* | (2006.01) |
| *F16H 63/30* | (2006.01) |
| *F16D 13/52* | (2006.01) |
| *F16H 57/10* | (2006.01) |
| *F16D 25/08* | (2006.01) |
| *F16D 25/10* | (2006.01) |

(Continued)

(52) U.S. Cl.
CPC ............. *F16D 13/52* (2013.01); *F16D 13/76* (2013.01); *F16D 25/087* (2013.01); *F16D 25/10* (2013.01); *F16H 57/10* (2013.01); *F16D 25/0638* (2013.01); *F16D 25/082* (2013.01); *F16D 67/04* (2013.01); *F16H 3/666* (2013.01); *F16H 2057/0216* (2013.01); *F16H 2057/087* (2013.01)

(58) Field of Classification Search
None
See application file for complete search history.

(56) References Cited

U.S. PATENT DOCUMENTS

| | | | | |
|---|---|---|---|---|
| 2,939,558 A | * | 6/1960 | Schjolin | ............... F16D 25/0638 192/106 F |
| 3,444,971 A | * | 5/1969 | Davidson | ............... F16D 25/082 192/85.49 |

(Continued)

*Primary Examiner* — Robert W Hodge
*Assistant Examiner* — Ryan P Dodd (57) ABSTRACT

A transmission having a rotating clutch pack assembly is provided, The rotating clutch pack having an interconnecting member, a plurality of friction discs, a rotating member, a first and a second axial bearing, and a biasing member. The interconnecting member is connected for common rotation with a member of the planetary gear set. The rotating member is connected to the second set of friction discs for common rotation. The first axial bearing is disposed between the clutch piston and the plurality of friction discs and the second axial bearing is disposed between the plurality of friction discs and the transmission housing. The biasing member is disposed between the interconnecting member and the rotating member. A clutch piston selectively applies an axial force through the first axial bearing, the plurality of friction discs, and the second axial bearing to the transmission housing.

18 Claims, 3 Drawing Sheets

(51) Int. Cl.
*F16D 13/76* (2006.01)
*F16D 25/0638* (2006.01)
*F16D 67/04* (2006.01)
*F16H 57/021* (2012.01)
*F16H 3/66* (2006.01)
*F16H 57/08* (2006.01)

(56) References Cited

U.S. PATENT DOCUMENTS

| | | | | |
|---|---|---|---|---|
| 3,613,848 | A * | 10/1971 | Reiff | F16D 25/082 |
| | | | | 192/113.34 |
| 5,462,147 | A * | 10/1995 | Sherman | F16D 55/44 |
| | | | | 192/12 C |
| 6,374,976 | B1 * | 4/2002 | Alberni | F16D 25/0638 |
| | | | | 192/113.34 |
| 9,261,186 | B2 * | 2/2016 | Singh | F16D 25/087 |
| 9,651,097 | B2 * | 5/2017 | Gilmore | F16D 29/00 |
| 2012/0217124 | A1 * | 8/2012 | Janson | F16H 57/08 |
| | | | | 192/41 R |
| 2013/0130861 | A1 * | 5/2013 | Hoffmann | F16H 48/22 |
| | | | | 475/231 |
| 2014/0001003 | A1 * | 1/2014 | Jeon | F16D 21/00 |
| | | | | 192/48.5 |

* cited by examiner

ROTATING CLUTCH PACK ASSEMBLY

CROSS-REFERENCE TO RELATED APPLICATIONS

This application is a continuation of U.S. application Ser. No. 14/196,791 filed Mar. 4, 2014. The disclosure of the above application is incorporated herein by reference.

FIELD

The invention relates generally to a rotating clutch assembly, and more particularly to a rotating clutch assembly for use in a transmission.

BACKGROUND

The statements in this section merely provide background information related to the present disclosure and may or may not constitute prior art.

A typical multiple speed planetary gear-type transmission includes a number of planetary gear sets, clutches, and brakes. A clutch includes a pack of interweaved friction discs and a piston that selectively applies a force on one side of the clutch pack. The resulting axial load on the opposite side of the clutch pack then travels through multiple interconnecting members and splined connections before grounding into the transmission housing. From a performance aspect, shift quality, quickness, and feel is compromised due to spline connection lock and end play between connections of members within the transmission.

While current multiple speed planetary gear-type transmission achieve their intended purpose, the need for new and improved transmission configurations which exhibit improved performance through faster shifts, shift quality, and shift feel is evident. Accordingly, there is a need for a rotation clutch pack assembly for a transmission.

SUMMARY

A transmission having a rotating clutch pack assembly is provided with the transmission including a planetary gear set, a clutch piston, and a transmission housing, and the rotating clutch pack assembly including a interconnecting member, a plurality of friction discs, a rotating member, a first and a second axial bearing, and a biasing member. The interconnecting member is connected for common rotation with a member of the planetary gear set. The plurality of friction discs includes a first set of friction discs and a second set of friction discs. The first set of friction discs is interweaved with the second set of friction discs. The first set of friction discs are connected with another member of the planetary gear set for common rotation. The rotating member has a first splined portion and a second splined portion. The first splined portion is connected to the second set of friction discs for common rotation. The first axial bearing is disposed between the clutch piston and the plurality of friction discs. The second axial bearing is disposed between the plurality of friction discs and the transmission housing. The biasing member is disposed between the interconnecting member and the rotating member. The biasing member applies a biasing force on the rotating member in an axial direction away from the interconnecting member. The clutch piston selectively applies an axial force through the first axial bearing, the plurality of friction discs, and the second axial bearing to the transmission housing.

In another example of the present invention, an outer periphery of the interconnecting member includes a splined surface. The splined surface of the interconnecting member is engaged with the second splined portion of the rotating member for common rotation.

In yet another example of the present invention, the second splined portion of the rotating member includes a first groove, the splined surface of the outer periphery of the interconnecting member includes a second groove aligned with the first groove forming an annular channel, and the biasing member is disposed in the annular channel.

In yet another example of the present invention, the transmission housing includes an axially facing bearing surface and the second axial bearing is disposed between the bearing surface of the transmission housing and the rotating member.

In yet another example of the present invention, the second axial bearing is disposed on the axially facing bearing surface of the transmission housing.

In yet another example of the present invention, the rotating member includes an annular channel disposed adjacent the second splined portion, the annular channel includes an axial facing surface, the second axial bearing is disposed between the transmission housing and the axial facing surface of the annular channel, and the second splined portion includes a radial groove in which is disposed a snap ring.

In yet another example of the present invention, the rotating member includes an axial facing biasing surface disposed between the second splined portion and the annular channel of the rotating member, the biasing member is a leaf spring having an inner periphery fixed to the interconnecting member and an outer periphery in contact with the biasing surface of the rotating member, and the interconnecting member is further disposed between the snap ring and the leaf spring thus ensuring a gap between the second axial bearing and the transmission housing and ensuring the position of the rotating member square to the axis of rotation.

In yet another example of the present invention, the second axial bearing is disposed in the annular channel of the rotating member.

In yet another example of the present invention, the first axial bearing is disposed on an axial contact surface of the clutch piston.

In yet another example of the present invention, the rotating member includes an axial facing biasing surface disposed between the second splined portion and the first splined portion of the rotating member and the biasing member is a spring plate having an inner periphery in contact with the interconnecting member and an outer periphery in contact with the biasing surface of the rotating member.

Further features and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
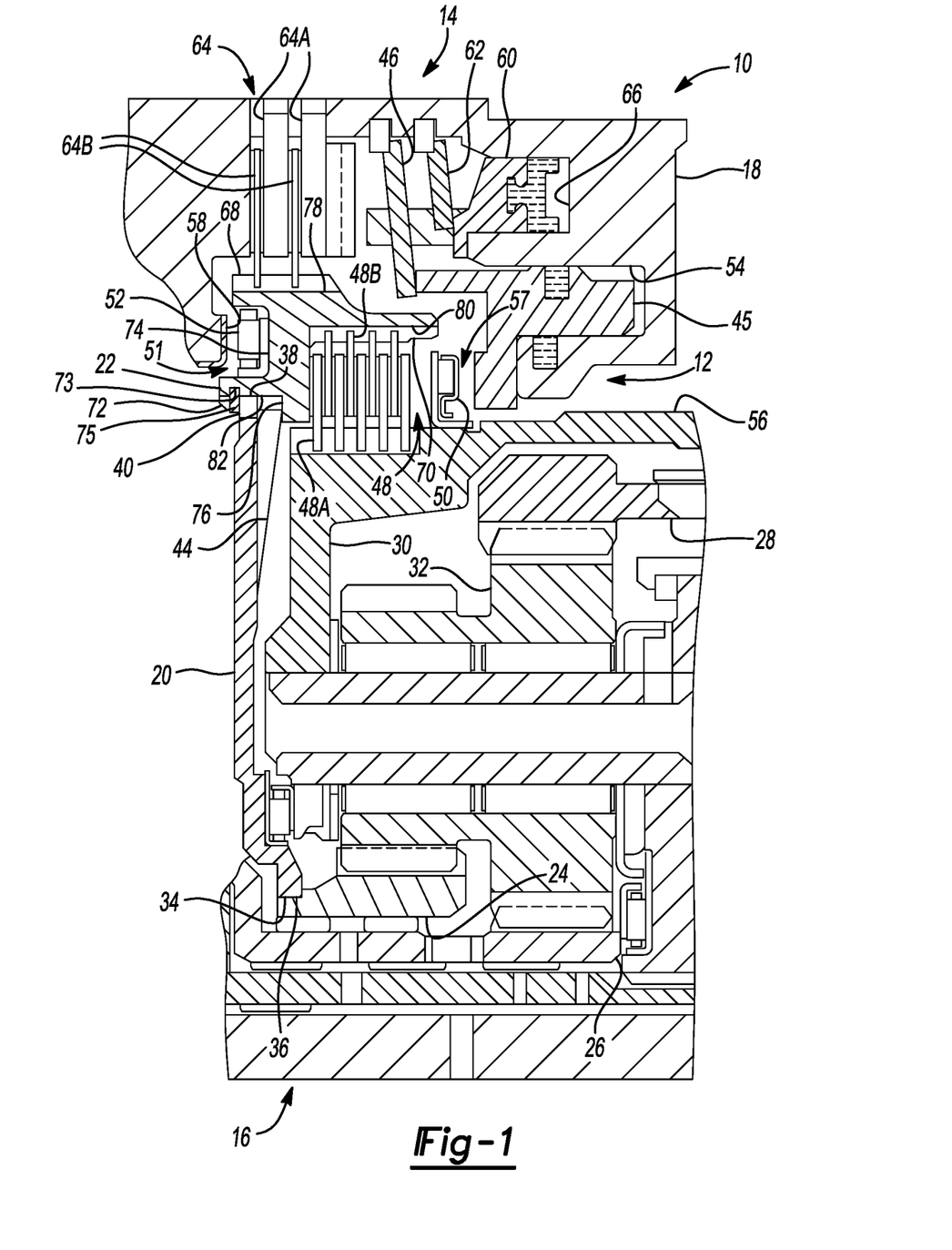
FIG. 1 is a partial cross-sectional view of an example of a transmission having a rotating clutch pack assembly according to the present invention.

Referring to the drawings, wherein like reference numbers refer to like components, in FIG. 1 an example of a portion of a transmission 10 having a clutch assembly 12, a brake assembly 14, a planetary gear set 16, a transmission housing 18, an interconnecting or third rotating member 20, and a common or dual clutch/brake or second rotating member 22 is illustrated. The planetary gear set assembly 16 includes a first sun gear 24, a second sun gear 26, a ring gear 28, and a carrier or first rotating member 30 that supports a plurality of pinion gears 32 which are each intermeshed with the first sun gear 24, the second sun gear 26, and the ring gear 28. The first sun gear 24 of the planetary gear set assembly 16 is connected to the common or dual clutch/brake member 22 through the interconnecting member 20. More specifically, the interconnecting member 20 is an annular plate having an inner periphery 34 that includes a plurality of splines 36 that engage with the sun gear 24 for common rotation. An outer periphery 38 of the interconnecting member 20 includes a plurality of splines 40 that engage with the common or dual clutch/brake member 22 for common rotation. The interconnecting member 20 also includes a biasing member 44 disposed between the interconnecting member 20 and the common or dual clutch/brake member 22. The biasing member 44 of the interconnecting member 20 biases the common or dual clutch/brake member 22 away from the interconnecting member 20.

The clutch assembly 12 includes a piston 45, a return spring 46, a plurality of friction plates 48, and a first and a second axial or thrust bearing 50, 52. The clutch assembly 12 is operable to selectively connect the carrier member 30 directly to the common or dual clutch/brake member 22. In more detail, the piston 45 is disposed in a first cavity or piston chamber 54 of the transmission housing 18. The return spring 46 biases the piston 45 into the first cavity or piston chamber 54. The plurality of friction plates 48 includes a first and a second set of friction plates 48A, 48B. The first set of friction plates 48A is splined to the carrier member 30 of the planetary gear set 16 and interweaved with the second set of friction plates 48B. The second set of friction plates 48B is splined to the common or dual clutch/brake member 22. The first axial or thrust bearing 50 is disposed on an outer periphery 56 of the carrier member 30 of the planetary gear set 16 between the piston 45 and the plurality of friction plates 48. It is preferred that a gap 57 is maintained between the first axial or thrust bearing 50 and the piston 45. The gap 57 enables further reduction in spin losses when the clutch assembly 12 is disengaged. More preferably, the gap 57 is to be approximately 1 mm to discourage residual lubrication fluid from bridging the gap 57 between the first axial or thrust bearing 50 and the piston 45 and creating spin losses. The result enables the piston 45 to remain stationary while applying an axial load on the plurality of friction plates 48 that remain rotating with the common or dual clutch/brake member 22. The second axial or thrust bearing 52 is disposed between the common or dual clutch/brake member 22 and an axially facing surface 58 of the transmission housing 18. Again, the result enables the common or dual clutch/brake member 22 to continue to rotate relative to the transmission housing 18 while the axial load of the piston 45 is received directly into the transmission housing 18 through the axially facing surface 58.

The brake assembly 14 includes a piston 60, a return spring 62, and a plurality of friction plates 64. The brake assembly 14 is operable to selectively connect the common or dual clutch/brake member 22 directly to the transmission housing 18. In more detail, the piston 60 is disposed in a second cavity or piston chamber 66 of the transmission housing 18. The return spring 62 biases the piston 60 into the second cavity or piston chamber 66. The plurality of friction plates 64 includes a first and a second set of friction plates 64A, 64B. The first set of friction plates 64A is splined to the transmission housing 18 and interweaved with the second set of friction plates 64B. The second set of friction plates 64B is splined to the common or dual clutch/brake member 22.

The common or dual clutch/brake member 22 includes a first splined portion 68, a second splined portion 70, a third splined portion 72, an annular channel 74, and a axial facing biasing surface 76. More specifically, the first splined portion 68 is formed into an outer periphery 78 of the common or dual clutch/brake member 22 and engages the second set of friction plates 64B of the plurality of friction plates 64 of the brake assembly 14. The second splined portion 70 is formed into a first inner periphery 80 of the common or dual clutch/brake member 22 and engages the second set of friction plates 48B of the plurality of friction plates 48 of the clutch assembly 12. The third splined portion 72 is formed into a second inner periphery 82 of the common or dual clutch/brake member 22, engages the splined portion 40 of the outer periphery 38 of the interconnecting member 20, and allows for axial relative movement between the common or dual clutch/brake member 22 and the interconnecting member 20. Additionally, the third splined portion 72 includes an annular channel 73 in which is disposed a snap ring 75. The common or dual clutch/brake member 22 is clamped to the snap ring 75 by the force acting on it from the leaf spring 44 thus maintaining position of the common or dual clutch/brake member 22 square to the axis of rotation when the piston 45 of the clutch assembly 12 is in the released state. The annular channel 74 is formed in the common or dual clutch/brake member 22 between the first and third splined portions 68, 72. The second axial or thrust bearing 52 is disposed in the annular channel 74 and radially aligned with the axially facing surface 58 of the transmission housing 18. It is preferred that a gap 51 is maintained between the second axial or thrust bearing 52 and the axially facing surface 58 of the transmission housing. The gap 51 enables further reduction in spin losses when the clutch assembly 12 is disengaged. More preferably, the gap 51 is to be approximately 1 mm to discourage residual lubrication fluid from bridging the gap 51 between the second axial or thrust bearing 52 and the axially facing surface 58 and creating spin losses. The axial facing biasing surface 76 is disposed adjacent to the third splined portion 72. The biasing member 44 of the interconnecting member 20 is disposed between the interconnecting member 20 and the axial facing biasing surface 76 of the common or dual clutch/brake member 22. The biasing member 44 urges the common or dual clutch/brake member 22 axially away from the axially facing surface 58 of the transmission housing 18 to maintain the gap 51 between the axially facing surface 58 and the second axial or thrust bearing 52.

Figure 2:
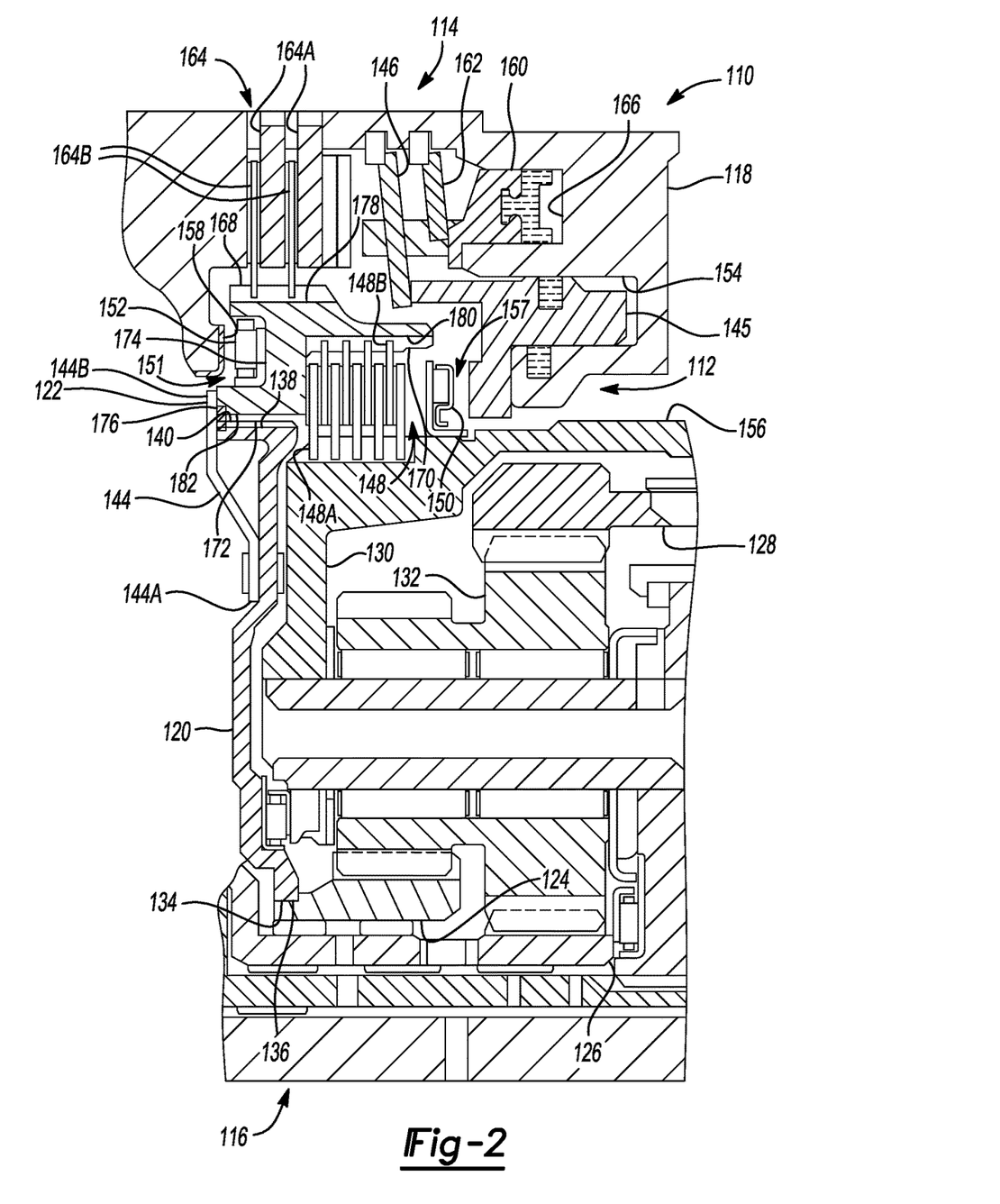
FIG. 2 is a partial cross-sectional view of an example of a transmission having a rotating clutch pack assembly according to the present invention.

Referring now to FIG. 2 another example of a transmission 110 having a clutch assembly 112, a brake assembly 114, a planetary gear set 116, a transmission housing 118, an interconnecting member 120, and a common or dual clutch/brake member 122 is illustrated. The planetary gear set assembly 116 includes a first sun gear 124, a second sun gear 126, a ring gear 128, and a carrier member 130 that supports a plurality of pinion gears 132 which are each intermeshed with the first sun gear 124, the second sun gear 126, and the ring gear 128. The first sun gear 124 of the planetary gear set assembly 116 is connected to the common or dual clutch/brake member 122 through the interconnecting member 120. More specifically, the interconnecting member 120 is an annular plate having an inner periphery 134 that includes a plurality of splines 136 that engage with the sun gear 124 for common rotation. An outer periphery 138 of the interconnecting member 120 includes a plurality of splines 140 that engage with the common or dual clutch/brake member 122 for common rotation. The interconnecting member 120 also includes a biasing member 144 having an inner periphery 144A and an outer periphery 144B. The inner periphery 144A of the biasing member 144 is fixed to the interconnecting member 120 and the common or dual clutch/brake member 122. The outer periphery 144B of the biasing member 144 is disposed abutting the common or dual clutch/brake member 122. The biasing member 144 of the interconnecting member 120 biases the common or dual clutch/brake member 122 axially away from the interconnecting member 120.

The clutch assembly 112 includes a piston 145, a return spring 146, a plurality of friction plates 148, and a first and a second axial or thrust bearing 150, 152. The clutch assembly 112 is operable to selectively connect the carrier member 130 directly to the common or dual clutch/brake member 122. In more detail, the piston 145 is disposed in a first cavity or piston chamber 154 of the transmission housing 118. The return spring 146 biases the piston 145 into the first cavity or piston chamber 154. The plurality of friction plates 148 includes a first and a second set of friction plates 148A, 148B. The first set of friction plates 148A is splined to an outer periphery 156 of the carrier member 130 of the planetary gear set 116 and interweaved with the second set of friction plates 148B. The second set of friction plates 148B is splined to the common or dual clutch/brake member 122. The first axial or thrust bearing 150 is disposed on the outer periphery 156 of the carrier member 130 of the planetary gear set 116 between the piston 145 and the plurality of friction plates 148. The result enables the piston 145 to remain stationary while applying an axial load on the plurality of friction plates 148 that remain rotating with the common or dual clutch/brake member 122. The second axial or thrust bearing 152 is disposed between the common or dual clutch/brake member 122 and an axially facing surface 158 of the transmission housing 118. Again, the result enables the common or dual clutch/brake member 122 to continue to rotate relative to the transmission housing 118 while the axial load of the piston 145 is received directly into the transmission housing 118 through the axially facing surface 158.

The brake assembly 114 includes a piston 160, a return spring 162, and a plurality of friction plates 164. The brake assembly 114 is operable to selectively connect the common or dual clutch/brake member 122 directly to the transmission housing 118. In more detail, the piston 160 is disposed in a second cavity or piston chamber 166 of the transmission housing 118. The return spring 162 biases the piston 160 into the second cavity or piston chamber 166. The plurality of friction plates 164 includes a first and a second set of friction plates 164A, 164B. The first set of friction plates 164A is splined to the transmission housing 118 and interweaved with the second set of friction plates 164B. The second set of friction plates 164B is splined to the common or dual clutch/brake member 122.

The common or dual clutch/brake member 122 includes a first splined portion 168, a second splined portion 170, a third splined portion 172, an annular channel 174, and a axial facing biasing surface 176. More specifically, the first splined portion 168 is formed into an outer periphery 178 of the common or dual clutch/brake member 122 and engages the second set of friction plates 164B of the plurality of friction plates 164 of the brake assembly 114. The second splined portion 170 is formed into a first inner periphery 180 of the common or dual clutch/brake member 122 and engages the second set of friction plates 148B of the plurality of friction plates 148 of the clutch assembly 112. The third splined portion 172 is formed into a second inner periphery 182 of the common or dual clutch/brake member 122, engages the splined portion 138 of the outer periphery 140 of the interconnecting member 120, and allows for axial relative movement between the common or dual clutch/brake member 122 and the interconnecting member 120. The annular channel 174 is formed in the common or dual clutch/brake member 122 between the first and third splined portions 168, 172. The second axial or thrust bearing 152 is disposed in the annular channel 174 and radially aligned with the axially facing surface 158 of the transmission housing 118. It is preferred that a gap 151 is maintained between the second axial or thrust bearing 152 and the axially facing surface 158 of the transmission housing. The gap 151 enables further reduction in spin losses when the clutch assembly 112 is disengaged. More preferably, the gap 151 is to be approximately 1 mm to discourage residual lubrication fluid from bridging the gap 151 between the second axial or thrust bearing 152 and the axially facing surface 158 and creating losses. The axial facing biasing surface 176 is disposed adjacent to the third splined portion 172. The biasing member 144 of the interconnecting member 120 is disposed between the interconnecting member 120 and the axial facing biasing surface 176 of the common or dual clutch/brake member 122.

Figures 3, 3A:
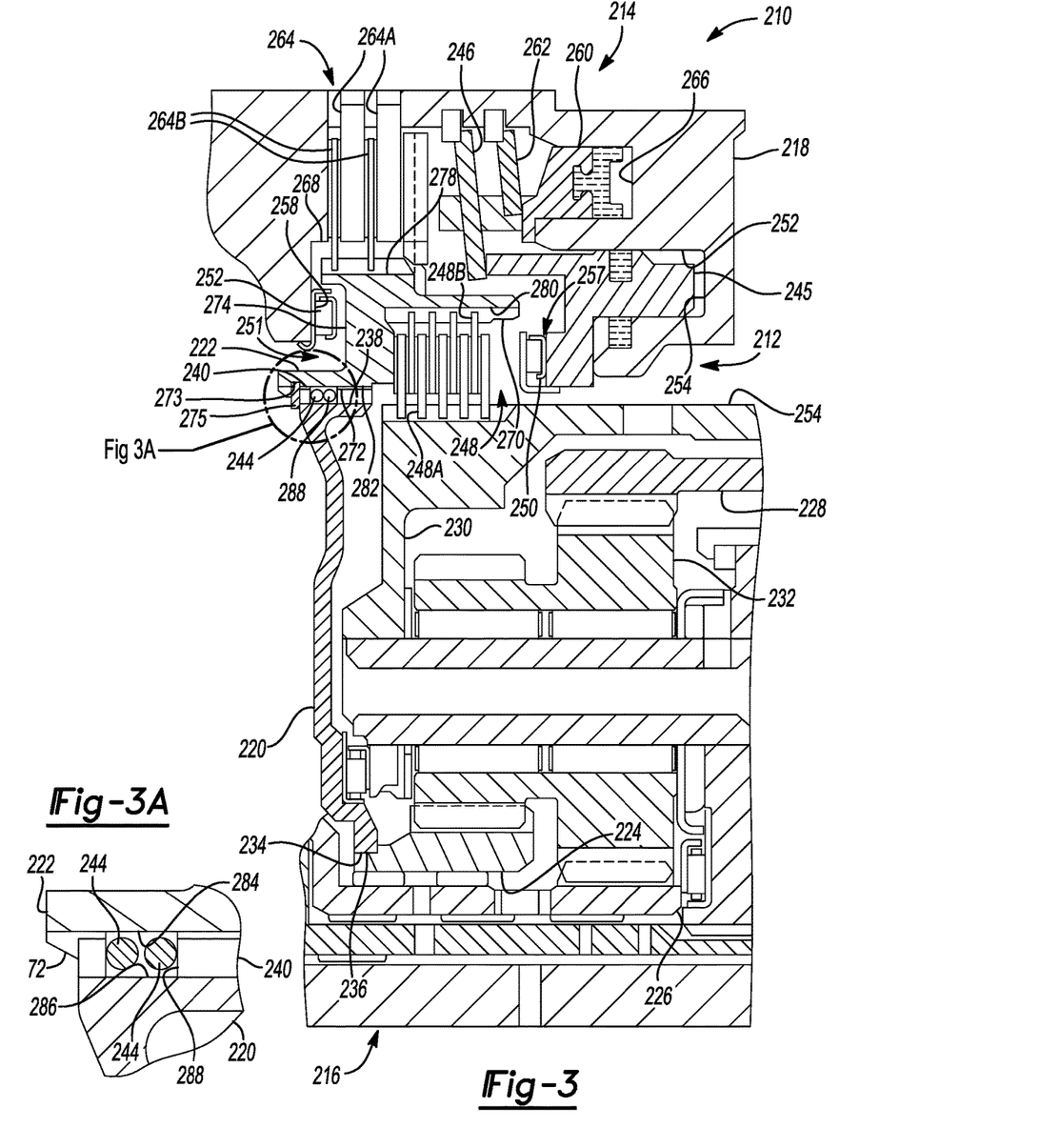
FIG. 3 is a partial cross-sectional view of an example of a transmission having a rotating clutch pack assembly according to the present invention.
FIG. 3A is a detailed cross-sectional view of an example of a connection between two members of a transmission having a rotating clutch pack assembly according to the present invention.

Referring now to FIG. 3 another example of a transmission 210 having a clutch assembly 212, a brake assembly 214, a planetary gear set 216, a transmission housing 218, an interconnecting member 220, and a common or dual clutch/brake member 222 is illustrated. The planetary gear set assembly 216 includes a first sun gear 224, a second sun gear 226, a ring gear 228, and a carrier member 230 that supports a plurality of pinion gears 232 which are each intermeshed with the first sun gear 224, the second sun gear 226, and the ring gear 228. The first sun gear 224 of the planetary gear set assembly 216 is connected to the common or dual clutch/brake member 222 through the interconnecting member 220. More specifically, the interconnecting member 220 is an annular plate having an inner periphery 234 that includes a plurality of splines 236 that engage with the sun gear 224 for common rotation. An outer periphery 238 of the interconnecting member 220 includes a plurality of splines 240 that engage with the common or dual clutch/brake member 222 for common rotation. The interconnecting member 220 also includes a biasing member 244 disposed between the interconnecting member 220 and the common or dual clutch/brake member 222. The biasing member 244 of the interconnecting member 220 biases the common or dual clutch/brake member 222 away from the interconnecting member 220.

The clutch assembly 212 includes a piston 245, a return spring 246, a plurality of friction plates 248, and a first and a second axial or thrust bearing 250, 252. The clutch assembly 212 is operable to selectively connect the carrier member 230 directly to the common or dual clutch/brake member 222. In more detail, the piston 245 is disposed in a first cavity or piston chamber 254 of the transmission housing 218. The return spring 246 biases the piston 245 into the first cavity or piston chamber 254. The plurality of friction plates 248 includes a first and a second set of friction plates 248A, 248B. The first set of friction plates 248A is splined to the carrier member 230 of the planetary gear set 216 and interweaved with the second set of friction plates 248B. The second set of friction plates 248B is splined to the common or dual clutch/brake member 222. The first axial or thrust bearing 250 is disposed on an axial contact surface 245A of the piston 245 radially aligned with the plurality of friction plates 248. It is preferred that a gap 257 is maintained between the first axial or thrust bearing 250 and the plurality of friction plates 248. The gap 257 enables further reduction in spin losses when the clutch assembly 212 is disengaged. More preferably, the gap 257 is to be approximately 1 mm to discourage residual lubrication fluid from bridging the gap 257 between the first axial or thrust bearing 250 and the plurality of friction plates 248 and creating spin losses. The result enables the piston 245 to remain stationary while applying an axial load on the plurality of friction plates 248 that remain rotating with the common or dual clutch/brake member 222. The second axial or thrust bearing 252 is disposed on an axially facing surface 258 of the transmission housing 218 and is axially aligned with the common or dual clutch/brake member 222. Again, the result enables the common or dual clutch/brake member 222 to continue to rotate relative to the transmission housing 218 while the axial load of the piston 245 is received directly into the transmission housing 218 through the axially facing surface 258.

The brake assembly 214 includes a piston 260, a return spring 262, and a plurality of friction plates 264. The brake assembly 214 is operable to selectively connect the common or dual clutch/brake member 222 directly to the transmission housing 218. In more detail, the piston 260 is disposed in a second cavity or piston chamber 266 of the transmission housing 218. The return spring 262 biases the piston 260 into the second cavity or piston chamber 266. The plurality of friction plates 264 includes a first and a second set of friction plates 264A, 264B. The first set of friction plates 264A is splined to the transmission housing 218 and interweaved with the second set of friction plates 264B. The second set of friction plates 264B is splined to the common or dual clutch/brake member 222.

The common or dual clutch/brake member 222 includes a first splined portion 268, a second splined portion 270, a third splined portion 272, and an annular channel 274. More specifically, the first splined portion 268 is formed into an outer periphery 278 of the common or dual clutch/brake member 222 and engages the second set of friction plates 264B of the plurality of friction plates 264 of the brake assembly 214. The second splined portion 270 is formed into a first inner periphery 280 of the common or dual clutch/brake member 222 and engages the second set of friction plates 248B of the plurality of friction plates 248 of the clutch assembly 212. The third splined portion 272 is formed into a second inner periphery 282 of the common or dual clutch/brake member 222, engages the splined outer periphery interconnecting member 220, and allows for axial relative movement between the common or dual clutch/brake member 222 and the interconnecting member 220. The annular channel 274 is formed in the common or dual clutch/brake member 222 between the first and third splined portions 268, 272. As shown in FIG. 3A in more detail, the third splined portion 272 of the common or dual clutch/brake member 222 also includes a radial groove 284 that coordinates with a radial groove 286 formed in the splined portion 240 of the interconnecting member 220. A resulting annular channel 288 formed by the radial grooves 284, 286 houses the biasing member 244. At rest, the biasing member 244 maintains a force on the common or dual clutch/brake member 222 urging the common or dual clutch/brake member 222 towards the piston 245 of the clutch assembly 212. When the piston 245 of the clutch assembly 212 is pressurized, the biasing member 244 is compressed allowing the common or dual clutch/brake member 222 to move axially towards and in contact with the second axial or thrust bearing 252 thus transferring an axial load of the pressurized piston 245 to the transmission housing 218 while maintaining relative rotation between the common or dual clutch/brake member 222 and the transmission housing 218.

Returning to FIG. 3, the annular channel 274 is formed in the common or dual clutch/brake member 222 between the first and third splined portions 268, 272. The second axial or thrust bearing 252 is disposed on the axially facing surface 258 of the transmission housing 218 radially aligned with the annular channel 274. It is preferred that a gap 251 is maintained between the second axial or thrust bearing 152 and the annular channel 274. The gap 251 enables further reduction in spin losses when the clutch assembly 212 is disengaged. More preferably, the gap 251 is to be approximately 1 mm to discourage residual lubrication fluid from bridging the gap 251 between the second axial or thrust bearing 252 and the annular channel 274 and creating losses.

The description of the invention is merely exemplary in nature and variations that do not depart from the gist of the invention are intended to be within the scope of the invention. Such variations are not to be regarded as a departure from the spirit and scope of the invention.

What is claimed is:

1. A rotating clutch assembly for a transmission, the rotating clutch assembly including;
   a clutch piston disposed in a clutch piston chamber of a housing of the transmission;
   a first, second, and third rotating member, each of the first and second rotating members having a first splined portion and wherein the third rotating member is connected for common rotation with the second rotating member,
   a biasing member disposed between the second rotating member and the third rotating member, and the biasing member applies a biasing force on the second rotating member in an axial direction away from the third rotating member,
   a first and a second set of friction discs, and wherein the first set of friction discs is interweaved with the second set of friction discs, the first set of friction discs is connected for common rotation with the first splined portion of the first rotating member, and the second set of friction discs is connected for common rotation with the first splined portion of the second rotating member; and a first and a second axial bearing, and wherein the first axial bearing is disposed between the clutch piston and the first and second sets of friction discs and the second axial bearing is disposed between the second rotating member and an axially facing bearing surface of the housing of the transmission, and wherein the clutch piston selectively applies an axial force through the first axial bearing, the plurality of friction discs, and the second axial bearing to the housing of the transmission.

2. The rotating clutch assembly of claim 1 wherein the an outer periphery of the third rotating member includes a splined surface, and wherein the splined surface of the third rotating member is engaged with a second splined portion of the second rotating member for common rotation.

3. The rotating clutch assembly of claim 2 wherein the second splined portion of the second rotating member includes a first groove, the splined surface of the outer periphery of the third rotating member includes a second groove aligned with the first groove forming an annular channel, and the biasing member is disposed in the annular channel.

4. The rotating clutch assembly of claim 1 wherein the second axial bearing is disposed on the axially facing bearing surface of the housing of the transmission.

5. The rotating clutch assembly of claim 2 wherein the second rotating member includes an annular channel disposed adjacent the second splined portion, the annular channel includes an axial facing surface, the second axial bearing is disposed between the housing of the transmission and the axial facing surface of the annular channel, and the second splined portion includes a radial groove in which is disposed a snap ring.

6. The rotating clutch assembly of claim 5 wherein the second rotating member includes an axial facing biasing surface disposed between the second splined portion and the annular channel of the second rotating member, the biasing member is a leaf spring having an inner periphery fixed to the third rotating member and an outer periphery in contact with the biasing surface of the second rotating member, and the third member is further disposed between the snap ring and the leaf spring thus ensuring a gap between the second axial bearing and the transmission housing and ensuring the position of the second rotating member thus having a second rotating member axis of rotation coaxial with the axis of rotation of the first and third rotating members.

7. The rotating clutch assembly of claim 6 wherein the second axial bearing is disposed in the annular channel of the second rotating member.

8. The rotating clutch assembly of claim 1 wherein the first axial bearing is disposed on an axial contact surface of the clutch piston.

9. The rotating clutch assembly of claim 1 wherein the second rotating member includes an axial facing biasing surface disposed between the second splined portion and the first splined portion of the second rotating member and the biasing member is a spring plate having an inner periphery in contact with the interconnecting member and an outer periphery in contact with the biasing surface of the rotating member.

10. A rotating clutch assembly for a transmission, the rotating clutch assembly including;
a clutch piston disposed in a clutch piston chamber of a housing of the transmission;
a first, second, and third rotating member, each of the first, second, and third rotating members having a first splined portion, the second rotating member has a second splined portion, and wherein the first splined portion of the third rotating member is connected for common rotation with the second splined portion of the second rotating member;
a first and a second set of friction discs, and wherein the first set of friction discs is interweaved with the second set of friction discs, the first set of friction discs is connected for common rotation with the first splined portion of the first rotating member, and the second set of friction discs is connected for common rotation with the first splined portion of the second rotating member; and
a first and a second axial bearing, and wherein the first axial bearing is disposed between the clutch piston and the first and second sets of friction discs and the second axial bearing is disposed between the first and second sets of friction discs and the housing of the transmission, and
wherein the clutch piston selectively applies an axial force through the first axial bearing, the plurality of friction discs, and the second axial bearing to the housing of the transmission.

11. The rotating clutch assembly of claim 10 further including a biasing member, and wherein the biasing member is disposed between the second rotating member and the third rotating member, and the biasing member applies a biasing force on the second rotating member in an axial direction away from the third rotating member.

12. The rotating clutch assembly of claim 11 wherein the second splined portion of the second rotating member includes a first groove, the first splined surface of the third rotating member includes a second groove aligned with the first groove forming an annular channel, and the biasing member is disposed in the annular channel.

13. The rotating clutch assembly of claim 10 wherein the housing of the transmission includes an axially facing bearing surface and the second axial bearing is disposed between the bearing surface of the housing of the transmission and the rotating member.

14. The rotating clutch assembly of claim 13 wherein the second axial bearing is disposed on the axially facing bearing surface of the housing of the transmission.

15. The rotating clutch assembly of claim 11 wherein the second rotating member includes an annular channel disposed adjacent the second splined portion, the annular channel includes an axial facing surface, the second axial bearing is disposed between the housing of the transmission and the axial facing surface of the annular channel, and the second splined portion includes a radial groove in which is disposed a snap ring.

16. A rotating clutch assembly for a transmission, the rotating clutch assembly including;
a first and second clutch piston, and wherein the second clutch piston is disposed in a second clutch piston chamber of a housing of the transmission radially outward from the first clutch piston disposed in a first clutch piston chamber of the housing of the transmission;
a first and second rotating member, and wherein each of the first and second rotating members having a first splined portion and the second rotating member has a second and third splined portion;
a first plurality of friction discs having a first and a second set of friction discs, and wherein the first set of friction discs is interweaved with the second set of friction discs, the first set of friction discs is connected for common rotation with the first splined portion of the first rotating member, and the second set of friction discs is connected for common rotation with the first splined portion of the second rotating member;

a second plurality of friction discs having a third and a fourth set of friction discs, and wherein the third set of friction discs is interweaved with the fourth set of friction discs, the third set of friction discs is connected for common rotation with the third splined portion of the second rotating member, and the fourth set of friction discs is connected for common rotation with a splined portion of the housing of the transmission; and a first and a second axial bearing, and wherein the first axial bearing is disposed between the clutch piston and the first and second sets of friction discs and the second axial bearing is disposed between the first and second sets of friction discs and the housing of the transmission, and wherein the first clutch piston selectively applies an axial force through the first axial bearing, the plurality of friction discs, and the second axial bearing to the housing of the transmission.

17. The rotating clutch assembly of claim 16 further including a third rotating member and a biasing member, and wherein the third rotating member is connected for common rotation with the second rotating member, the biasing member is disposed between the second rotating member and the third rotating member, and the biasing member applies a biasing force on the second rotating member in an axial direction away from the third rotating member.

18. The rotating clutch assembly of claim 17 wherein the biasing member is one of a biasing member disposed in a groove formed between the second rotating member and the third rotating member and a leaf spring disposed between the second rotating member and the third rotating member.

* * * * *